United States Patent [19]

Coucoulas

[11] Patent Number: 5,178,319
[45] Date of Patent: Jan. 12, 1993

[54] COMPRESSION BONDING METHODS

[75] Inventor: Alexander Coucoulas, Basking Ridge, N.J.

[73] Assignee: AT&T Bell Laboratories, Murray Hill, N.J.

[21] Appl. No.: 679,506

[22] Filed: Apr. 2, 1991

[51] Int. Cl.⁵ ............... B23K 103/10; B23K 35/368; C03C 27/00
[52] U.S. Cl. ............... 228/234; 228/263.12; 228/263.17; 228/903; 428/630; 428/650
[58] Field of Search ............ 228/263.12, 903, 263.17, 228/233, 234; 428/630, 650

[56] References Cited

U.S. PATENT DOCUMENTS

| | | | |
|---|---|---|---|
| 3,360,849 | 1/1968 | Forman et al. | 228/263.12 |
| 3,577,629 | 5/1971 | Wallis et al. | 228/903 |
| 3,609,470 | 9/1971 | Kuiper | 228/903 |
| 3,665,594 | 5/1972 | Raithel | 228/263.12 |
| 3,860,405 | 1/1975 | Coucoulas et al. | 65/42 |
| 4,610,746 | 9/1986 | Broer et al. | 156/275.5 |
| 4,659,378 | 4/1987 | Volz et al. | 228/263.12 |
| 4,687,285 | 8/1987 | Hily et al. | 350/96.18 |
| 4,711,521 | 12/1987 | Thillays | 350/96.20 |
| 4,793,688 | 12/1988 | Aiki et al. | 350/252 |
| 4,897,711 | 1/1990 | Blonder et al. | 357/74 |

Primary Examiner—Richard K. Seidel
Assistant Examiner—Jeffrey T. Knapp
Attorney, Agent, or Firm—R. B. Anderson

[57] ABSTRACT

Elements such as glass spheres (11) and optical fibers (30') are permanently bonded to aluminum surfaces (13) of substrates (12) by applying pressure along with energy to the interface of the element and the aluminum. For example, a glass sphere is bonded by pressing it against aluminum while heating the aluminum. As an alternative to heating, acoustic energy can be applied to the sphere along with the pressure. Glass optical fibers can be bonded to aluminum surfaces in the same manner.

11 Claims, 1 Drawing Sheet

COMPRESSION BONDING METHODS

TECHNICAL FIELD

This invention relates to compression bonding methods and, more particularly, to methods for bonding optical elements such as glass spheres to aluminum.

BACKGROUND OF THE INVENTION

Optical communications systems commonly use optical fibers for carrying very large quantities of information with low distortion and at low cost over great distances. Optical systems are also promising for such purposes as computing because of the inherently high speed at which they can be operated. For these reasons, considerable development work has been done on such components of optical communications systems as glass optical fibers and glass lenses.

An example of such a development is the photonics package described in the co-pending patent application of Ackerman et al. Ser. No. 572,592, filed Aug. 27, 1990, now U.S. Pat. No. 5,124,281, granted Jun. 23, 1992, hereby incorporated h erein by reference, which describes a method for mounting spherical glass lenses on a silicon substrate so that, after assembly of the package, they will be precisely aligned on opposite sides of a laser. The ball lenses then direct the light from one end of the laser to a photodetector and light from the other end of the laser to an optical fiber. Epoxy is used for securing in place the glass spherical lenses and the optical fiber.

Photonics packages typically contain electronics circuits in addition to elements such as lasers and detectors. These devices can be easily contaminated and, as a consequence, much effort has been expended in providing suitable packaging for sealing them from the external environment. Epoxy and other adhesives can constitute a contamination source and if such a source could be eliminated, the packaging of the various elements in a photonics package would be simplified.

SUMMARY OF THE INVENTION

In accordance with the invention, elements such as glass spheres and optical fibers are permanently bonded to aluminum surfaces of substrates by applying pressure along with energy to the interface of the element and the aluminum. For example, a glass sphere is bonded by pressing it against aluminum while heating the aluminum. As an alternative to heating, acoustic energy can be applied to the sphere along with the pressure. Glass optical fibers can be bonded to aluminum surfaces in the same manner.

It is well known that silicon substrates are desirable for making photonics packages because grooves for supporting miniscule elements such as optical fibers and glass spherical lenses can be formed with precision by masking and anisotropic etching. It is known from the semiconductor art that aluminum can be coated on silicon surfaces with reliability and precision. Thus, the invention permits glass lenses and glass optical fibers to be conveniently bonded to aluminum surfaces of silicon substrates without the use of epoxy or any other kind of adhesive, to permit the fabrication of photonics packages without the contamination that might result from the use of adhesives.

Various other benefits, embodiments and modifications of the invention will be understood from a consideration of the following detailed description taken in conjunction with the accompanying drawing.

DETAILED DESCRIPTION

Figure 1:
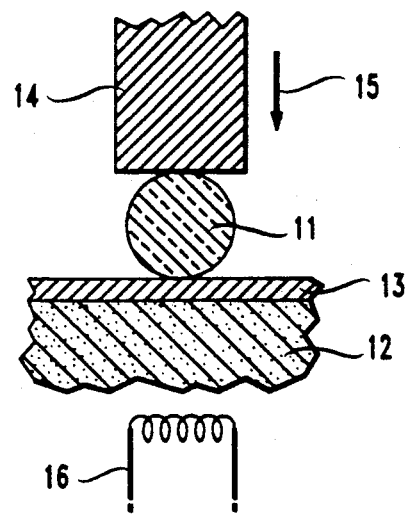
FIG. 1 is a schematic sectional view of apparatus for bonding elements in accordance with one embodiment of the invention.

Referring now to FIG. 1, there is shown an illustrative embodiment of the invention comprising a glass spherical lens 11 which is intended to be bonded to a silicon substrate 12 having on one surface thereof an aluminum coating 13. As is known in the art, aluminum can be made to adhere directly to silicon, or an intermediate layer of chromium between the silicon and the aluminum can be used. The glass ball is made to adhere to the aluminum 13 by using a tool 14 to compress the glass ball against the aluminum as indicated by the arrow 15. Simultaneously with the application of pressure, the aluminum 13 is heated, as by a heater 16 shown schematically.

The heat and pressure that is applied is sufficient to cause bonding in accordance with the invention but is not sufficient to significantly permanently deform the configuration of the glass sphere 11 or damage the sphere. As is known, glass spheres are used in optical communications systems as lenses, and so it is normally important that the glass not be heated above its softening point or that the pressure be sufficient to distort its shape. I have found that, with a spherical glass lens having a diameter of three hundred microns, the applied force may be six hundred grams, and the heat applied may be of a temperature greater than three hundred degrees Centigrade such as three hundred fifty degrees Centigrade. With the heat and pressure applied for a period of more than approximately three seconds, I have found that a reliable bond is formed at the interface of the glass sphere and the aluminum 13. My tests have shown that such bonds have a vertical pull value of eight grams, which is satisfactory for most purposes. A major advantage of my invention, as mentioned above, is that the bond does not require the introduction of any adhesives to the systems which might constitute a contaminant.

My findings have been entirely experimental, and I cannot state categorically the mechanism responsible for the adherence. It would appear, however, that the applied pressure may cause the curved surface of the glass sphere to rupture the inherent coating of the native aluminum oxide on the aluminum layer 13 so as to permit a reaction of the pure aluminum with the silicon dioxide of the glass. Ordinarily, it is difficult to bond a sphere surface to a flat surface as shown, because technically a sphere contacts a perfectly flat surface only at a single point. In this case, the geometry may assist in the bond to the extent that it may aid in a rupture of the aluminum oxide coating on aluminum layer 13. It is to be emphasized, however, that the inventive concept does not rely on any particular theoretical mechanism; rather, it is based on observed results. Under the same conditions, a glass sphere will not bond to a gold surface, probably because gold is quite unreactive.

Figure 2:
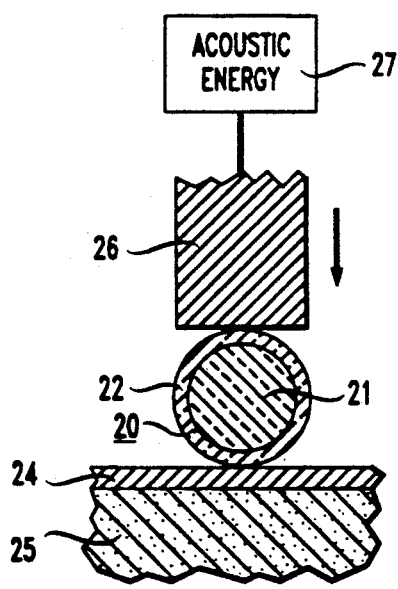
FIG. 2 is a schematic sectional view showing another embodiment of the invention.

Referring now to FIG. 2, there is shown a spherical lens 20 comprising a sapphire core 21 with a silicon dioxide outer coating 22. It is desired to bond this sphere to an aluminum coating 24 on a silicon substrate 25. As before, a tool 26 applies pressure as shown, but rather than applying heat energy, acoustic energy from a source 27 is applied to the interface of the sphere with the aluminum coating by way of the tool 26 and the sphere 20. This demonstrates that the energy applied to the interface need not necessarily be thermal energy, but may be in the form of acoustic energy. My experiments show that reliable bonding will occur between a glass sphere three hundred microns in diameter with a load of thirty grams and an applied acoustic energy of twenty watts, for three seconds. If desired, both heat and acoustic energy can be applied.

Figure 3:
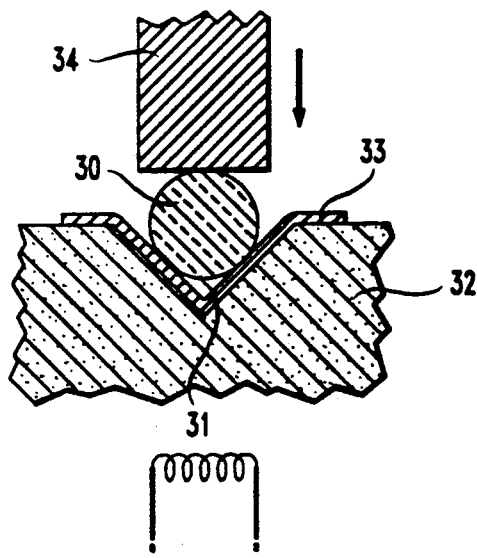
FIG. 3 is a schematic sectional view showing still another embodiment.

Referring to FIG. 3, there is shown still another embodiment in which a glass sphere 30 is contained within a V-groove 31 in a silicon substrate 32. The aforementioned Ackerman et al. application describes the method of making the V-groove such that a spherical lens can be precisely located within it. The spherical lens bears against an aluminum layer 33 covering the V-groove. As before, the glass sphere is bonded to the aluminum by simultaneously applying pressure and heating it. Rather than a single location of bond as in FIG. 1, the embodiment of FIG. 3 gives a reliable bond at the two contact locations of the glass sphere.

Also, glass spheres have been mounted in the pyramidal cavities characteristic of etched silicon. In this case, the sphere contacts the cavity at four points. Testing showed that such bonded samples survived shock tests of two thousand Gs (0.5 millisecond) on all axes, and twenty G vibration levels at ten hertz to two kilohertz.

Figure 4:
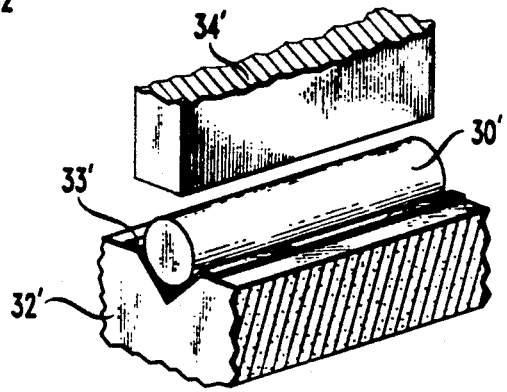
FIG. 4 is a schematic perspective view illustrating the bonding of an optical fiber within the groove of a substrate.

The embodiment of FIGS. 1 and 3 may also be used for sealing a glass optical fiber to an aluminum layer. In such case, the element 11 of FIG. 1 and the element 30 of FIG. 3 could be considered as being cross-sectional representations of an optical fiber. FIG. 4 is a representation of an optical fiber version of the apparatus of FIG. 3. That is, optical fiber 30' corresponds to element 30 of FIG. 3, substrate 32' corresponds to substrate 32 of FIG. 3 and tool 34' is the tool that is used for making the seal. As shown in FIG. 4, the pressure should be applied by the tool 34' along whatever length of optical fiber one intends to bond to the aluminum.

My experiments have shown a reliable bond under conditions of applied pressure and energy between a curved surface of silicon dioxide and a surface of aluminum. The bonding process is generally simpler than conventional glass-to-metal seals and may even be simpler than adhesive methods. It is not necessary that the curved surface be part of either a sphere or a cylinder; other solid bodies having curved surfaces would work equally as well. Also, it is not necessary that the member being bonded be of silicon dioxide. If the member should contain oxygen which can react with the aluminum, then other oxide-containing glasses and materials such as aluminum dioxide could also be used. Various other embodiments and modifications may be made without departing from the spirit and scope of the invention.

I claim:

1. A method for bonding a glass sphere to a substrate comprising the steps of:

making the substrate such that at least part of one surface thereof is of aluminum;

positioning the sphere on the aluminum surface;

and simultaneously pressing together the sphere and the aluminum and heating the interface of the sphere and the aluminum so as to make a permanent bond between the sphere and the aluminum, the heat and pressure being the only energy applied to the interface.

2. A method for bonding an oxide-containing member having a curved surface to aluminum comprising the steps of:

positioning the curved surface of the member on the aluminum surface;

and simultaneously pressing together the member and the aluminum and heating the interface of the member and the aluminum so as to make a permanent bond between the member and the aluminum, the heat and pressure being the only energy applied to the interface.

3. The method of claim 2 wherein:
   the member is made predominantly of silicon dioxide.

4. The method of claim 3 wherein:
   the member is a glass optical fiber.

5. The method of claim 3 wherein:
   the member is a glass sphere.

6. The method of claim 2 wherein:
   the aluminum surface has a V-shape;
   and the curved surface of the member contacts the aluminum surface at two locations.

7. The method of claim 5 wherein:
   the steps of pressing and applying energy are insufficient to deform significantly the glass sphere.

8. The method of claim 7 wherein:
   the glass sphere is a lens.

9. A method for bonding a glass sphere to a silicon substrate comprising the steps of:

coating part of the silicon substrate with chromium;
   coating the chromium with aluminum;
   positioning the sphere on the aluminum surface;
   and simultaneously pressing together the sphere and the aluminum and applying energy to the interface of the sphere and the aluminum so as to make a permanent bond between the sphere and the aluminum.

10. A method for bonding a glass sphere to a substrate comprising the steps of:

making the substrate such that at least one surface thereof is of aluminum;
    positioning the sphere on the aluminum;
    simultaneously pressing together the sphere and the aluminum and applying energy to the interface of the sphere and aluminum so as to make a permanent bond between the sphere and the aluminum;
    and wherein the sphere is approximately three hundred microns in diameter, the sphere and aluminum are pressed together with a force of approximately six hundred grams, and the interface of the sphere and the aluminum is heated to a temperature in excess of approximately three hundred degrees Centigrade.

11. The method of claim 2 wherein:
    the portion of the aluminum surface with which the oxide-containing member makes contact is substantially flat, whereby the oxide-containing member concentrates forces resulting from said pressing on said aluminum surface.

* * * * *